United States Patent
Adrianowycz et al.

(10) Patent No.: US 10,011,492 B2
(45) Date of Patent: Jul. 3, 2018

(54) CARBON PRODUCTS DERIVED FROM LIGNIN/CARBON RESIDUE

(71) Applicant: GrafTech International Holdings Inc., Brooklyn, OH (US)

(72) Inventors: Orest L. Adrianowycz, Broadview Hts., OH (US); Bassam Alnasleh, Sugar Land, TX (US); Omer Gul, Olmsted Falls, OH (US); Andrew Adam Hausner, Parma Heights, OH (US); Robert E. Miller, Southaven, MS (US); Ching-Feng Chang, Strongsville, OH (US)

(73) Assignee: GrafTech International Holdings Inc., Brooklyn Heights, OH (US)

( * ) Notice: Subject to any disclaimer, the term of this patent is extended or adjusted under 35 U.S.C. 154(b) by 0 days.

(21) Appl. No.: 14/914,419

(22) PCT Filed: Aug. 20, 2014

(86) PCT No.: PCT/US2014/051796
§ 371 (c)(1),
(2) Date: Feb. 25, 2016

(87) PCT Pub. No.: WO2015/034670
PCT Pub. Date: Mar. 12, 2015

(65) Prior Publication Data
US 2016/0200579 A1   Jul. 14, 2016

Related U.S. Application Data

(60) Provisional application No. 61/873,999, filed on Sep. 5, 2013.

(51) Int. Cl.
C01B 32/205 (2017.01)
C04B 35/532 (2006.01)
C04B 35/52 (2006.01)

(52) U.S. Cl.
CPC .......... C01B 32/205 (2017.08); C04B 35/522 (2013.01); C04B 35/532 (2013.01); C04B 2235/77 (2013.01); C04B 2235/9607 (2013.01)

(58) Field of Classification Search
CPC ..... C01B 32/205; C01B 31/04; C04B 35/522; C04B 35/532
See application file for complete search history.

(56) References Cited

U.S. PATENT DOCUMENTS 2,549,117 A   4/1951   Nelson
3,567,808 A   3/1971   Smith
(Continued)

FOREIGN PATENT DOCUMENTS

CN   102502598   6/2012
WO   1981003332   11/1981
(Continued)

OTHER PUBLICATIONS

Extended European Search Report from corresponding EP Application No. 14842401.1, dated Mar. 17, 2017.
(Continued)

Primary Examiner — Richard M Rump

(57) ABSTRACT

A precursor having at least five percent of lignin based coke and d002 spacing of more than 3.36 angstroms and less 3.44 for making graphite. Methods for making a green/graphite article include mixing coke derived from a petroleum product, a coal product or a bitumen product with coke derived from lignin. Alternatively, the precursor material for the various types of coke may be mixed and coked together. The mixture may be formed into a desired shape. The article may be subsequently carbonized and graphitized. The amount of lignin derived coke comprises a sufficient quantity to change at least a selected property of the graphite article.

13 Claims, 6 Drawing Sheets

(56) References Cited

U.S. PATENT DOCUMENTS

| | | |
|---|---|---|
| 4,332,856 A | 6/1982 | Hsu |
| 4,410,472 A | 10/1983 | Grubbs et al. |
| 5,344,921 A | 9/1994 | Sudo |
| 5,709,774 A | 1/1998 | Naieni |
| 6,855,180 B1 | 2/2005 | Pinatti |
| 2005/0003200 A1 | 1/2005 | Norley et al. |
| 2008/0185112 A1 | 8/2008 | Argyropoulos |
| 2009/0314689 A1 | 12/2009 | Varadaraj et al. |
| 2010/0326880 A1 | 12/2010 | Chakka et al. |
| 2011/0044881 A1 | 2/2011 | Sansberry et al. |
| 2011/0233042 A1 | 9/2011 | Siskin et al. |
| 2013/0183227 A1 | 7/2013 | Wohlmann |

FOREIGN PATENT DOCUMENTS

| | | |
|---|---|---|
| WO | 2012038259 | 3/2012 |
| WO | 2012/112108 | 8/2012 |

OTHER PUBLICATIONS

Luo, J. "Lignin-Based Carbon Fiber" (Thesis). The University of Maine, May 2010.
Manufacturing: Synthetic and Cellulosic Fiber Formation Technology, downloaded from the internet at <<http:/www.fibersource.com/f-tutor/techpag.htm>> on Mar. 19, 2015.
Horst Nimz, "Beech Lignin-Proposal of a Constitutional Scheme", Angew. Chem. internat. Edit., vol. 13, 1974, No. 5, pp. 313-321.
Nunn et al., "Product Compositions and Kinetics in the Rapid Pyrolysis of Milled Wood Lignin", American Chemical Society, Ind. Eng. Chem. Process Des. Dev., vol. 24, 1985, pp. 844-852.
Cliff Eberie, "Commercialization of New Carbon Fiber Materials Based on Sustainable Resources for Energy Applications", Oak Ridge National Laboratory, Mar. 2013.
International Search Report filed in PCT/US2013/68388, dated Feb. 28, 2014.
International Search Report filed in PCT/US2014/051796 dated Nov. 21, 2014.

CARBON PRODUCTS DERIVED FROM LIGNIN/CARBON RESIDUE

TECHNICAL FIELD

The disclosure relates to the field of carbon products and methods of making carbon products and more specifically to the field of making graphite products in which lignin is a precursor for the making of the graphite products.

Lignin, an industrial byproduct of wood-free papermaking, is one of the most abundant organic based polymers on earth. Lignin is renewable, readily available and relatively inexpensive. Currently there is a limited market for lignin. In fact less than 2% of available lignin is used in the manufacturing of industrial materials or chemicals. Lignin is a polyaromatic-polyol with extensive cross linking and strong inter- and intra-molecular interactions, hence its chemical structure is very complex. Due to lignin's inherent high aromatic based carbon content and perceived high coking value, it displays potential as a precursor for carbon based products. However, the polyol has been found to be amorphous and highly functionalized, and attempts to utilize lignin as a feedstock for carbon products have had little success.

BRIEF DESCRIPTION

One method disclosed herein is a method of making a graphite article. Such method includes mixing a first amount of coke derived from a petroleum product, a coal product or a bitumen product with a second amount coke derived from lignin, thereby forming a green mixture. The green mixture is formed into a desired shape, thereby forming a green article. The green article may be subsequently carbonized and optionally graphitized. The second amount of coke comprises a sufficient quantity to change at least a selected property of the graphite article to obtain the desired set of properties of the graphite article as compared to a second graphite article made from only coke from the first amount of coke.

Another method disclosed herein includes a method of making a green article. The method includes mixing a first amount of coke precursor material derived from a petroleum product, a bitumen product or a coal product with a second amount of coke precursor material derived from lignin, thereby forming a precursor mixture. The precursor mixture is coked to thereby forming a coke. The coke is formed into a desired orientation. The second amount of coke precursor comprises a sufficient quantity to change at least one selected property of a final article formed from the coke to obtain the desired set of properties in the final article as compared to a second final article made from only coke of the first amount of coke precursor material.

A further method included herein is a method of making a green article. The method includes mixing a first amount of coke precursor material derived from a carbon residue having a carbon content of at least 70 percent with a second amount of coke precursor material derived from lignin, thereby forming a precursor mixture. The precursor mixture is coked thereby forming a coke. The coke is formed into a desired orientation.

Whereby the second amount of coke precursor comprises a sufficient quantity to change selected properties of a final article formed from the coke to obtain the desired set of properties in the final article as compared to a second final article made from only coke of the first amount of coke precursor material.

A monolithic graphite article having a volume of at least 1 cubic centimeter ("cc") formed from a precursor including at least five percent by weight of lignin based coke and $d_{002}$ spacing of more than 3.36 angstroms and less than 3.44.

It is to be understood that both the foregoing general description and the following detailed description provide embodiments of the disclosure and are intended to provide an overview or framework of understanding the nature and character of the invention as it is claimed.

DETAILED DESCRIPTION

Figure 1:
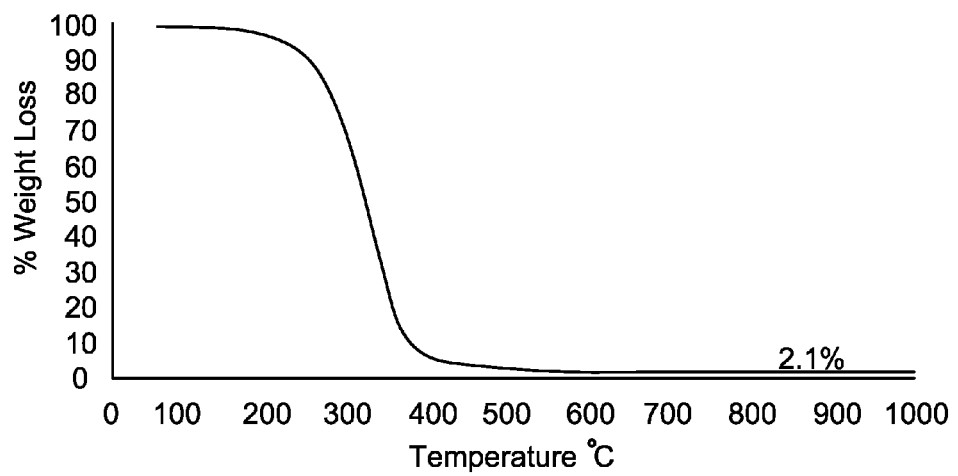
FIG. 1 is a TGA of decant oil sample used in the example.

The concepts disclosed herein relate to the use of lignin as a precursor for carbon products.

Typical sources of lignin include Weyerhaeuser Co. of Washington State; Lignol Innovations of British Columbia, Canada; Mascoma of Lebanon, N.H.; Virdia of Redwood City, Calif.; and Fibria Cellulose of Sao Paulo, Brazil.

Lignins can be grouped into three (3) broad classes: softwood ("SWKL") or coniferous (gymnosperm), hardwood ("HWL") (dicotyledonous angiosperm), and grass or annual plant (monocotyledonous angiosperm) lignins and combinations thereof. Lignin may also be prepared from other types of biomass, including grasses, and consistent batches of lignin-rich materials recovered from the waste materials in large-scale brewing or biorefinery processes. An example of the lignin precursor includes softwood alkali lignin which may be obtained from the black liquor from softwood alkali pulping processes. In the manufacture of wood pulp, some of the lignin and hemicelluloses are solubilized and separated from the cellulose. The black liquor from the pulping process is the solubilized lignin and hemicellulose.

Hardwood feedstocks include *Acacia*; *Afzelia*; *Synsepalum duloificum*; *Albizia*; Alder (e.g. *Alnus glutinosa, Alnus rubra*); Applewood; Arbutus; Ash (e.g. *F. nigra, F. quadrangulata, F. excelsior, F. pennsylvanica lanceolata, F. Latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum,*

*Aesculus glabra, Aesculus flava/Aesculus octandra*); Butternut; *Catalpa*; Cherry (e.g. *Prunnus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros Melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam, Hophornbeam; Ipe; Iroko; Ironwood (e.g. *Bangkirai, Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, Krugiodendron *ferreum, Lyonothamnus lyonii* (*L. floribundus*), *Mesua ferrea, Olea* spp., *Olneya tesota, Ostrya virginiania, Parrotia persica, Tabebuia serratifolia*); *Jacaranda; Jotoba*; Lacewood; Laurel; Limba; Lignum vitae; Locust (e.g. *Robinia pseudacacia, Gleditsia triancanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus mublenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoume; Oregon Myrtle; California Bay Laurel; Pear; Poplar (e.g. *P. balsamifera, P. nigra*), Hybrid Poplar (*Populus×Canadensis*); Ramin; Red cedar; Rosewood; Sal; Sandalwood, *Sassafras*; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks may be selected from *acacia*, aspen, beech, eucalyptus, maple, birch, gum, oak, poplar, and combinations/hybrids thereof, preferably from *Populus* spp. (e.g. *Populus tremuloides*), *Eucalyptus* ssp. (e.g. *Eucalyptus globulus*), *Acacia* spp. (e.g. *Acacia dealbata*), and combinations/hybrids thereof.

Softwood feedstocks include *Araucaria* (e.g. *A. cunninghamii, A. angustifolia, A. araucana*); softwood Cedar (e.g. *Juniperus virginiana, Thuja plicata, Thuja occidentalis, Chamaecyparis thyoides, Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European Yew; Fir (e.g. *Abies Balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*) Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks may be selected from loblolly pine (*Pinus taeda*) radiata pine, jack pine, spruce (e.g. white, interior, black), Douglas fir, *Pinus silvestris, Picea abies*, and combinations/hybrids thereof. Further, the softwood feedstocks may be selected from pine (e.g. *Pinus radiata, Pinus taeda*); spruce; and combinations/hybrids thereof.

Other sources of graphite precursors include a petroleum product, a coal product or bitumen product. The petroleum product may include at least one of decant oil ("DO"), decant oil based pitch, petroleum pitch and combinations thereof. The coal product may include at least one of coal tar, coal tar pitches, coal tar distillate and combinations thereof. The bitumen product may include at least one of mineral wax, shale oil, oil sands and combinations thereof. Anyone of the afore noted graphite precursors can be used in any combination thereof.

In a further embodiment the graphite precursor may be carbon residue. The carbon residue has a carbon content of at least seventy (70%) percent. Preferably more than seventy-five (75%) percent carbon. The carbon content of a material may be measured by CHN analysis. A CHN Analyzer is a scientific instrument which can determine the elemental composition of a sample. One example of a CHN analyzer is a 2400 CHN/O Analyzer or 2400 CHN/O Analyzer II, both available from Perkin Elmer of Waltham, Mass. U.S.A.

In a particular embodiment, the carbon residue may be selected from the group of coal based raw material(s), petroleum based raw material(s) and combinations thereof. The mixture may form a carbon product precursor mixture. Examples of carbon residue include petroleum based products such as decant oil, decant oil based pitch and petroleum pitch as well as coal based products such as, coal tar, coal tar distillate, coal tar pitches, mesophase pitch, isotropic pitch, and combinations thereof of any of the afore petroleum and coal based products. Another example of a non-exhaustive list of carbon residues include decant oil, decant oil based pitches, coal tar pitches, petroleum pitches, coal tar distillates and combinations thereof. The above examples and descriptions of a carbon residue are applicable to all embodiments disclosed herein.

An embodiment disclosed herein includes a method of making a graphite article with a desired set of properties. The method includes mixing a first amount of coke derived from a petroleum product, a coal product or bitumen product with a second amount of coke derived from lignin, thereby forming a green mixture. The green mixture is formed into a desired shape, thereby forming a green article. Examples of the forming may include extrusion, milling, molding, hot pressing, isostatic pressing, and cold pressing. Prior to forming if so desired, either amount of coke or both coke may be milled or sized as desired.

The green article may be carbonized and, if desired, subsequently graphitized. The carbonization and graphitization steps may incur consecutively in time within the same processing equipment or remotely in different processing equipment as well as at different locations. A green article is an article which includes raw materials which have not been subjected to a carbonization step. Such as the binder pitch or an impregnation pitch included in an article after forming or impregnation but prior to carbonization of the article.

Preferably the second amount of coke derived from lignin comprises a sufficient quantity to change selected properties of the graphite article to obtain the desired set of properties in the graphite article as compared to a second graphite article made from only coke from the first amount of coke derived from the petroleum product, the coal product or the bitumen product. Examples of desired properties that may be adjusted by the use of the second amount of coke include the coefficient of thermal expansion ("CTE"), the $d_{002}$ spacing between the layered planes within the graphite article, the char weight or modified Conradson carbon ("MCC") of the article, coke yield, bulk density, specific resistance, and real density.

The first amount of coke and the second amount of coke may be calcined either together or separately, additionally the first amount of coke and the second amount of coke may be calcined under the same conditions or under separate conditions. Typical calcining conditions include heating the coke to a temperature of about 800-1600° C., usually about 1100-1400° C. The calcining usually takes place in a rotating drum at atmospheric pressure.

An exemplary embodiment of the coking process may include mixing lignin and decant oil. The mixture may be prepared by first heating the decant oil to slightly above 60° C. and then mixed with the solid lignin via mechanical stirring while heating at 60° C. for 10 minutes or until the lignin appeared evenly distributed in the decant oil.

Coking of the lignin, decant oil, or mixtures thereof may be carried out in a vessel without agitation. Samples to be coked may be carbonized in a reactor at a temperature of at least 400° C., more preferably at least about 450° C. under pressure in an inert environment. The reactor may be heated at a rate of about 100° C. per hour until desired carbonization temperature is reached. The temperature of the reactor is held for a desired period to allow carbonization to occur. The reactor is then allowed to cool below 50° C. prior to removal of the coke. The coke removed from the reactor may be referred to as "green" coke. This process can be used for a feedstock of just lignin, just carbon residue (e.g., decant oil), or a mixture of both.

The green coke may be crushed and calcined at temperatures in the range of 1100 to 1600° C. for a desired period of time, thereby forming calcined coke.

In another example of a coking process, a heavy hydrocarbon feedstock is thermally decomposed, or cracked, into coke and lighter hydrocarbon products. Of the various types of coking processes currently used the delayed coking has emerged as the technology of choice by most refiners due to its lower investment costs and its ability to produce comparable yields of products but of higher quality. A typical delayed coking process is a semi-continuous process in which heavy hydrocarbon feedstock is heated to cracking temperature using a heat source such as a coker furnace. The heated feedstock is then fed continuously to a coking drum, where it reacts in its contained heat to convert the feedstock to coke and cracked vapors. The cracked vapors are passed overhead to a coker fractionator, condensed and recovered as lower boiling hydrocarbon products. The fractionator bottoms may be recycled to the feedstock if desired. When the coke drum contents reach a predetermined level, the feedstock supply is switched to another drum, and the full drum is cooled and de-coked. The entire process for one drum, from fill cycle start to fill cycle start, may require between 18 and 120 hours.

In a delayed coking process, feedstock is introduced to the coking drum during the entire fill cycle. If the fill cycle lasts for 30 hours, the feedstock first introduced to the coking drum is subjected to coking conditions for that 30 hour period of time. Each succeeding increment of feedstock, however, is coked for a lesser period of time and the final portion of feedstock introduced to the coking drum is subjected to coking conditions only for a relatively short period of time. For further guidance on the delayed coking process, see U.S. Pat. No. 7,371,317 which is incorporated herein by reference in its entirety.

As for the graphite article it may be formed with at least about 0.01 percent by weight of the second amount of coke derived by lignin to no more than about seventy-five (75%) percent by weight such second amount of coke. In a further embodiment, the weight percentage of the second amount of coke used to make the graphite article may include 0.1 percent up to about sixty (60%) percent. In another further embodiment, the weight percentage of the second amount of coke may comprise about one (1%) percent up to about fifty (50%) percent.

Another method disclosed herein includes a method of making a green article. The green article is an article that has not been subjected to either carbonization or graphitization conditions. For carbonization to take place, typically the article has been heated to at least 400° C. The method includes mixing a first amount of coke precursor material derived from a petroleum product, bitumen product or a coal product with a second amount of coke precursor material derived from lignin, thereby forming a precursor mixture. The petroleum product, the bitumen product or the coal product in this embodiment are the same as described above.

This method further includes coking the precursor mixture thereby forming coke and forming the coke into a desired orientation. As part of the forming, the coke may be mixed with other materials such as a binder such as pitch or any other suitable binder material as well as additives such as carbon fibers or graphite powders. The applicable forming techniques include all of the forming techniques listed above. If so desired prior to forming the coke as well as any other desired material to be added to the coke may be milled and sized to a desired specification.

Preferably, the second amount of coke precursor derived from lignin comprises a sufficient quantity to change at least a selected property of a final article formed from the coke to obtain the desired set of properties in the final article as compared to a second final article made from only coke of the first amount of coke precursor material derived from the petroleum product, the coal product or the bitumen product.

As for the final article it may be formed with at least about 0.01 percent by weight of the second amount of coke derived by lignin to no more than about seventy-five (75%) percent by weight such second amount of coke. In a further embodiment, the weight percentage of the second amount of coke used to make the final article may include 0.1 percent up to about sixty (60%) percent. In another further embodiment, the weight percentage of the second amount of coke comprises about one (1%) percent up to about fifty (50%) percent. This paragraph also applies to the making of the green article with a carbon residue as described below.

A further method of making a green article includes mixing a first amount of coke precursor material derived from a carbon residue having a carbon content of at least seventy (70%) percent with a second amount of coke precursor material derived from lignin, thereby forming a precursor mixture. The precursor mixture is then coked and the resultant coke is formed into a desired orientation. Preferably, the second amount of coke precursor derived from lignin comprises a sufficient quantity to change at least a selected property of the final article formed from the coke to obtain the desired set of properties in the final article as compared to a second final article made from only coke of the first amount of coke precursor material from a the carbon residue. CHN analysis may be used to determine if the carbon residue has the aforementioned carbon content.

Also included in this disclosure is a monolithic graphite article having a volume of at least 1 cubic-centimeter ("cc") formed from precursors including at least five (5%) percent by weight of lignin based coke and $d_{002}$ spacing of more than 3.36 angstroms and less than 3.44. In a particular embodiment, the article exhibited a 2θ angle between 26° and 27°. In a further embodiment, the graphite article may have a CTE of at least 1.59 ppm/° C., further a CTE of at least 2.14 ppm/° C., and even further a CTE of at least 4.5 ppm/° C. The above CTE's are measured in the with grain direction between the temperatures of 30-100° C.

The above particular embodiments are not mutually exclusive of each other.

The various embodiments described herein can be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

EXAMPLES

The embodiments disclosed herein will now be further described by the below non-limiting examples.

Two (2) types of lignin were used in the following examples. A hardwood lignin ("HWL") obtained from Mascoma, a biomass to ethanol refinery located in Michigan. Softwood Kraft lignin ("SWKL") was obtained from Weyerhaeuser. The dried HWL was used as received, however the SWKL was obtained as "lignin cake" and contained 45% water by weight. The lignin cake was dried at 105° C. under vacuum for several hours until no weight loss was observed upon further heating. CHN analysis of the lignin raw materials is provided in Table 1. Mott filtered decant oil was used as received from Seadrift Coke, LLP. Koppers 111° C. softening point coal tar pitch was used as the binder in preparation of the coke rods. Commercially available SRS oil was used as received.

TABLE 1

| CHN Analysis of Raw Lignin | | | |
|---|---|---|---|
| Lignin | Carbon % | Hydrogen % | Nitrogen % |
| HWL | 59.26 | 5.5 | 0.5 |
| SWKL | 54.14 | 4.33 | 0.80 |

X-Ray diffraction data was collected on a Rigaku Ultima 3 diffractometer equipped with a ¼° divergence slit, a 0.30 mm receiving slit, a graphite monochrometer and a scintillation detector. The X-Ray source (Cu $k\alpha_1$ λ=1.54056 Å) was used at 40 kV and 44 mA. Diffraction was undertaken from 5-90° 2θ with a step size of 0.02° 2θ and a dwell time 3 sec/step at room temperature. The original patterns were analyzed using Jade 9+ software (Materials Data Inc., 2011). Profile fitting using Pearson-VII function was applied to find the peak value and the full-width half-maximum (FWHM).

Thermo gravimetric analysis (TGA) was completed using a Q5000 modulated TGA with a platinum pan under $N_2$ atmosphere with a heating rate of 5° C. per min from room temperature to 1000° C. CTE measurements were carried out at 30-100° C.

Lignin/decant oil mixtures were prepared by first heating the decant oil to slightly above 60° C. and then mixing it with the solid lignin via mechanical stirring while heating at 60° C. for 10 minutes or until the lignin was evenly distributed in oil.

Pyrolysis of lignin, decant oil, and mixtures thereof were carried out in a 4 liter pressure vessel without stirring. Typically a 2 L closed container was charged with 1000 g of feedstock and placed inside the pressure vessel prior to pyrolysis. All samples were pyrolized at 475° C. for 16 hours under 200 psi of N2. The vessel was heated at a rate of 100° C. per hour to 450° C. and then at a rate to of 10° C. hour until the hold temperature of 475° C. was reached. The reactor was then allowed to cool below 50° C. prior to removal of the container.

The analysis and comparison of coke quality was performed on green coke, calcined coke and graphitized coke rods composed of various weight percentages of both lignin and decant oil. The green coke was crushed and calcined at about 1400° C. for 30 minutes. Graphite rods were first prepared by milling 400 g of calcined coke. Then 300 grams of 55 flour (55% of such flour will pass through a 200 mesh screen) was mixed with 106 g of binder pitch and 12 g of SRS oil. The rods were then extruded from this mixture and baked at 1000° C. for 2 hours with a ramp rate of 60° C./minute. The rods were then graphitized at 3000° C. for 30 minutes with a ramp rate of 1000° C./hour.

TGA Analysis

Figure 2:
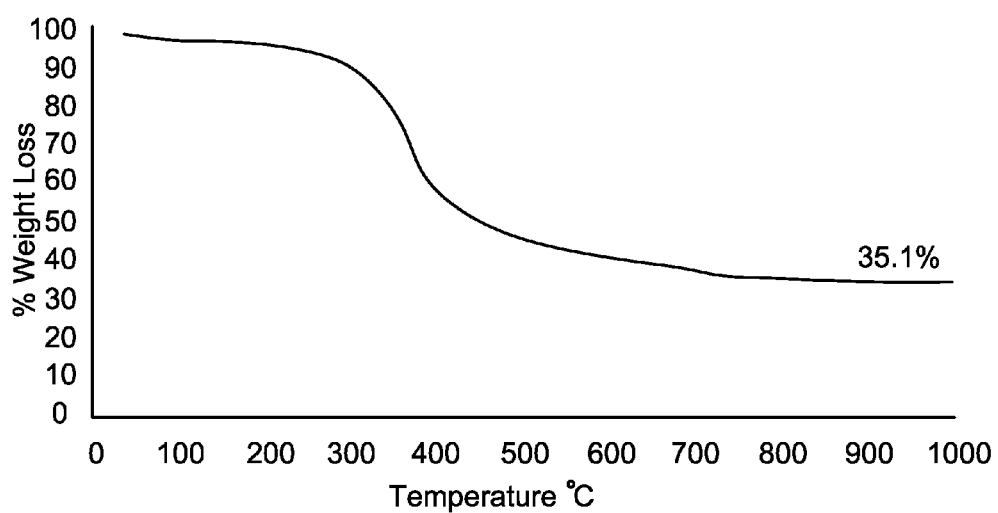
FIG. 2 is a TGA of a HWL sample used in the example
Figure 3:
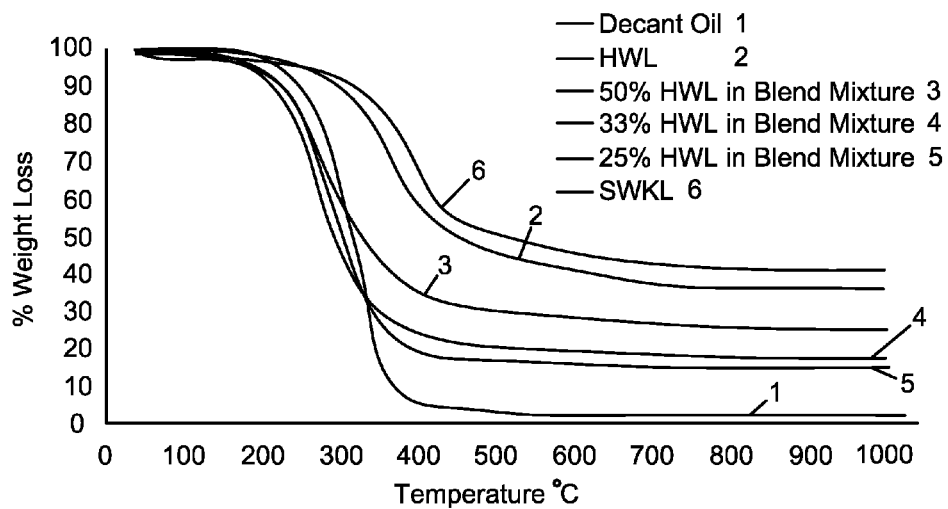
FIG. 3 is a TGA of lignin samples, decant oil sample and various mixtures of the two

FIG. 1 and FIG. 2 show TG curves of decant oil and HWL respectively. The inherent differences in reactivity under the same pyrolysis conditions are apparent from these two curves. Gradual heating of decant oil to 1000° C. produces a char yield of 2.1% (FIG. 1) as compared to 35.1% for HWL (FIG. 2) and 40.0% for SWKL (FIG. 3, curve 6). During coking decant oil undergoes cracking and polymerization.

Lignin does not undergo evaporation, rather it decomposes into lighter fragments. Its higher reactivity due to phenolic hydroxyl groups allows for facile radical-induced condensation of aromatic nuclei. Thus, higher char yields are obtained from the lignin samples as compared to the decant oil sample.

In order to investigate the interaction between lignin and decant oil, several mixtures of HWL and decant oil were prepared and analyzed by TGA (FIG. 3). FIG. 3 shows a clear trend between lignin percentage and char yield. In FIG. 3, DO is line 1; HWL lignin is line 2; line 3 is a 50% mixture of DO and HWL by weight; line 4 is a mixture of 33% HWL and 67% DO by weight; line 5 is a mixture of 25% HWL and 75% DO by weight, line 6 is SWKL. It was assumed that if no interactions between the two components occurred then pyrolysis of the mixtures would yield a char weight equal to the sum of individual components. However this was not the case as shown in Table 2.

TABLE 2

TGA: Char yield of HWL/Decant Oil Mixtures

|  | Decant oil | HWL | 50% Lignin | 33% Lignin | 25% Lignin |
|---|---|---|---|---|---|
| Expected | NA | NA | 18.50 | 12.87 | 10.25 |
| Experimental | 2.06 | 35.1 | 24.52 | 16.96 | 14.28 |
| Weight % Increase | NA | NA | 32.54 | 31.78 | 39.32 |

According to the individual pyrolysis experiments of decant oil and HWL, it was expected that a 50/50 mixture would yield 18.5% ("expected value") as char, however 24.5% was obtained experimentally. In fact, all mixtures led to an average 34.6% increase in char yield as compared to the expected values. The results indicate that the mixtures did not follow the rule of mixtures. Due to the insolubility of lignin in petroleum residues the lignin was expected to have a negative impact on the morphology and physical characteristics of the coke obtained from the decant oil portion of the mixture. In other words, the resulting coke produced from a mixture of lignin and decant oil would be a mixture of bio-coke and sponge coke or lower quality grade petroleum coke. This was not the case.

Coking Experiments

Various mixtures of HWL, SWKL and decant oil were prepared and coked under conditions often used for the preparation of needle coke from decant oil. All coking experiments composing mixtures or individual raw materials were executed at 475° C. with a hold time of 16 hours with a heating rate of 100° C./hour under 200 psi of $N_2$. The corresponding coke yields were summarized in Table 3.

TABLE 3

Product Yields of Pyrolysis/Coking Experiments

| | Lignin % in the Blend | | | | | | | Control |
|---|---|---|---|---|---|---|---|---|
| | 100 | 50 | 33 | 25 | 20 | 10 | 5 | 100% DO |
| SWKL | | | | | | | | |
| Coke Yield % | 52.50 | 55.49 | 54.76 | 51.20 | 55.90 | 54.28 | 56.30 | 55.60 |
| Volatile % | 47.50 | 44.51 | 45.24 | 48.80 | 44.10 | 45.72 | 43.70 | 44.40 |
| Theoretical Coke Yield | NA | 54.05 | 54.58 | 54.83 | 54.98 | 55.29 | 55.45 | NA |

| | Lignin % | | | | | | | Control |
|---|---|---|---|---|---|---|---|---|
| | 100 | 50 | 33 | 25 | 20 | 10 | 5 | 100% DO |
| HWL | | | | | | | | |
| Coke Yield % | 52.98 | 49.51 | 49.53 | 54.25 | 49.77 | 49.77 | 47.83 | 55.60 |
| Volatile % | 47.02 | 50.49 | 50.47 | 45.75 | 50.23 | 497.67 | 956.60 | 44.40 |
| Theoretical Yield | NA | 54.29 | 54.74 | 54.95 | 55.08 | 55.34 | 55.47 | NA |

The reported yields are an average of two (2) runs executed for each mixture. Theoretical coke yields were calculated based on yields obtained from individual SWKL, HWL, and decant oil coking runs while assuming no molecular interaction between the individual components of the mixture. The theoretical and experimental coke yields are relatively close in comparison with the theoretical yields. The relatively high coke yields of lignin led to product yields very similar to that of pure decant oil.

Product Analysis

The characteristics and physical properties of carbon products can be directly related to the raw materials used, their composition and the whether the materials are mixed before coking or after coking. Common measures of these properties are the coefficient of thermal expansion (CTE), electrical resistance, and density. For example, the desired properties of regular graphite electrodes and those used in ultra-high power furnaces are provided below in Table 4. CTE data provided herein is in the with-grain direction.

TABLE 4

Properties of Graphite Electrodes

| Property | Regular Electrode | UHP |
|---|---|---|
| CTE ($10^{-6}$/° C.) | 0.7-2.7 | 0.3-1.0 |
| Bulk Density g/cc | 1.55-1.70 | 1.60-1.75 |
| Specific Resistance (μΩm) | 6.0-10.0 | 4.0-7.0 |

In order to compare the properties of the SWKL/DO and HWL/DO cokes were prepared; each mixture was calcined, blended with pitch, extruded into 5.0 inch graphite rods with a diameter of 19 mm, baked and graphitized. Each graphite rod was then analyzed, the summaries of which are provided in Table 5 and Table 6.

Figure 4:
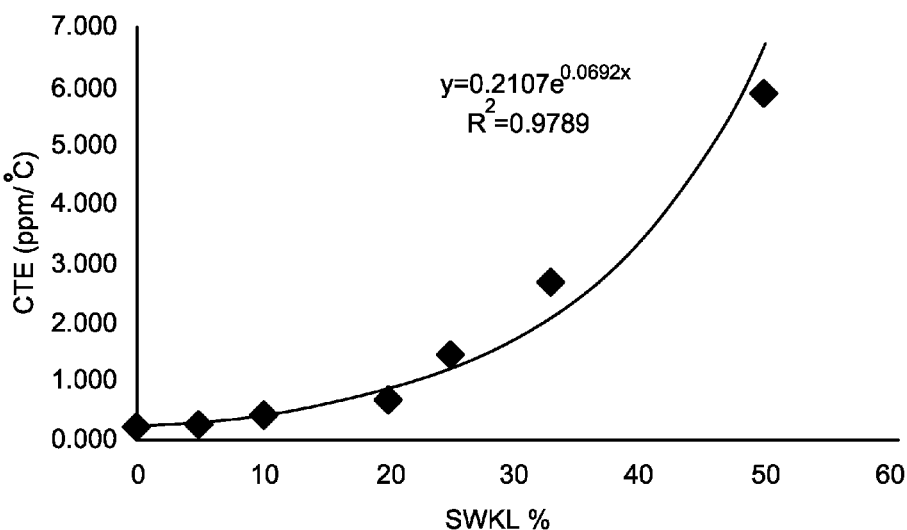
FIG. 4 is plot of the CTE of a graphite rod vs. percentage of SWKL used as a precursor for the graphite rod.
Figure 5:
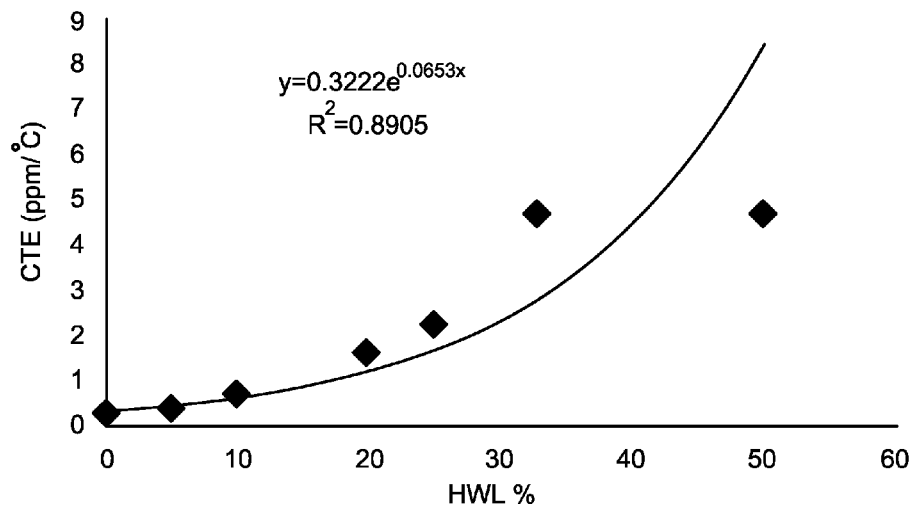
FIG. 5 is plot of the CTE of a graphite rod vs. percentage of HWL used as a precursor for the graphite rod.

Under the aforementioned coking conditions, the 100% decant oil rod displayed a value of 0.266 ppm/° C. between the temperatures of 30-100° C. It is clear from Tables 5 and 6 that CTE increases with increased lignin percentage. Interestingly, on average, mixtures of HWL provided CTE values higher than those of SWKL, except 50% HWL/DO blend. This was unexpected because SWKL contains more hydroxyl functionalities than HWL, which renders it more reactive and it was expected to form coke with less ordered graphitic structures. It was found that up to 20 weight percent SWKL may be incorporated while holding CTE values below 1.0 ppm/° C. Correlations of lignin percentage and CTE are provided in FIGS. 4 and 5. The percentages in Tables 5 and 6 are by weight.

TABLE 5

Properties of Co-Coked SWKL/DO Rods

| Blend | Lignin % | CTE (ppm/° C.) | Specific Resistance (μΩm) | Bulk Density g/cc | Real Density g/cc |
|---|---|---|---|---|---|
| SWKL/DO | 50 | 5.856 | 18.18 | 1.52 | 2.01 |
| SWKL/DO | 33 | 2.639 | 10.57 | 1.57 | 2.091 |
| SWKL/DO | 25 | 1.415 | 10.76 | 1.54 | 1.903 |
| SWKL/DO | 20 | 0.678 | 10.12 | 1.50 | 2.14 |

TABLE 5-continued

Properties of Co-Coked SWKL/DO Rods

| Blend | Lignin % | CTE (ppm/° C.) | Specific Resistance (μΩm) | Bulk Density g/cc | Real Density g/cc |
|---|---|---|---|---|---|
| SWKL/DO | 10 | 0.390 | 9.02 | 1.48 | 2.15 |
| SWKL/DO | 5 | 0.266 | 9.4 | 1.45 | 2.151 |
| DO | 0 | 0.238 | 9.77 | 1.46 | 2.211 |

TABLE 6

Properties of Co-Coked HWL/DO Rods

| Blend | Lignin % | CTE (ppm/° C.) | Specific Resistance (μΩm) | Bulk Density g/cc | Real Density g/cc |
|---|---|---|---|---|---|
| HWL/DO | 50 | 4.692 | 26.04 | 1.50 | 1.989 |
| HWL/DO | 33 | 4.668 | 13.53 | 1.60 | 2.111 |
| HWL/DO | 25 | 2.192 | 10.22 | 1.58 | 2.143 |
| HWL/DO | 20 | 1.596 | 11.06 | 1.50 | 2.125 |
| HWL/DO | 10 | 0.665 | 10.52 | 1.47 | 2.147 |
| HWL/DO | 5 | 0.339 | 10.27 | 1.44 | 2.141 |
| DO | 0 | 0.238 | 9.77 | 1.46 | 2.211 |

The hypothesis that lignin disturbs the coalescence of mesophase into large domains of highly ordered graphitic structures and results in sponge coke was tested by preparing/pyrolyzing lignin coke and decant oil based coke separately. Each batch was also calcined separately under conditions identical to those for the co-pyrolyzed samples. Calcined coke flour was then milled and mixed in the desired ratio prior to the preparation of the corresponding coke rod. The coke rods prepared were baked and graphitized under identical procedures mentioned previously.

TABLE 7

Properties of Separately Coked HWL/DO Coke Rods

| Blend | Lignin % | CTE (ppm/° C.) | Specific Resistance (μΩm) | Bulk Density g/cc |
|---|---|---|---|---|
| HWL/DO | 50 | 1.55 | 29.25 | 1.24 |
| HWL/DO | 25 | 0.93 | 14.96 | 1.39 |
| HWL/DO | 20 | 0.77 | 12.76 | 1.43 |
| HWL/DO | 10 | 0.46 | 10.34 | 1.46 |
| HWL/DO | 5 | 0.336 | 9.78 | 1.46 |
| DO | 0 | 0.238 | 9.77 | 1.46 |

Figure 6:
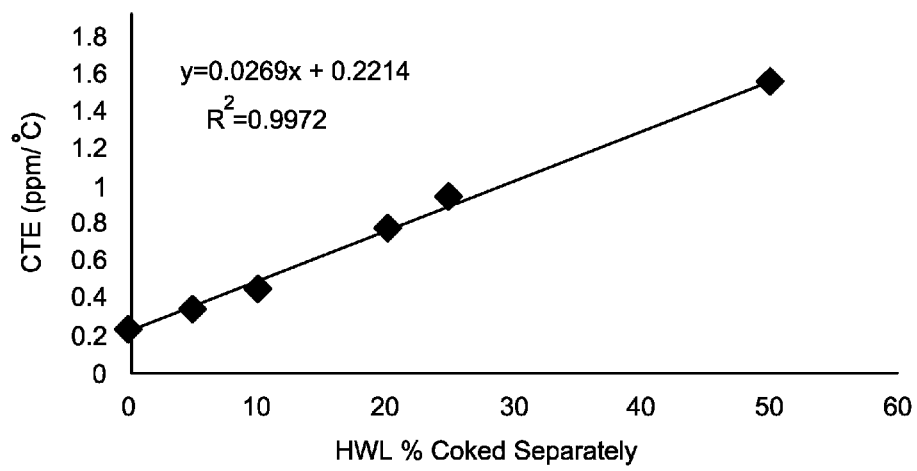
FIG. 6 is plot of the CTE of a graphite rod vs. percentage of HWL used as a precursor for the graphite rod, HWL and decant oil coked separately

It is clear from Table 7 and FIG. 6 that notably lower CTE values may be obtained from preparing graphite electrodes with mixed lignin/DO cokes rather than co-cokes. Although at concentrations below 10% co-coke produced rods exhibited slightly higher CTE. Interestingly however, the effect on specific resistance remains relatively unchanged while "bulk density" decreases slightly. Employing this method of preparation allows for the incorporation of 25% lignin while holding CTE to below 1 ppm/° C. For other specialty products requiring higher CTE values and higher density, co-pyrolysis is a more suitable method of coke preparation.

Figure 7:
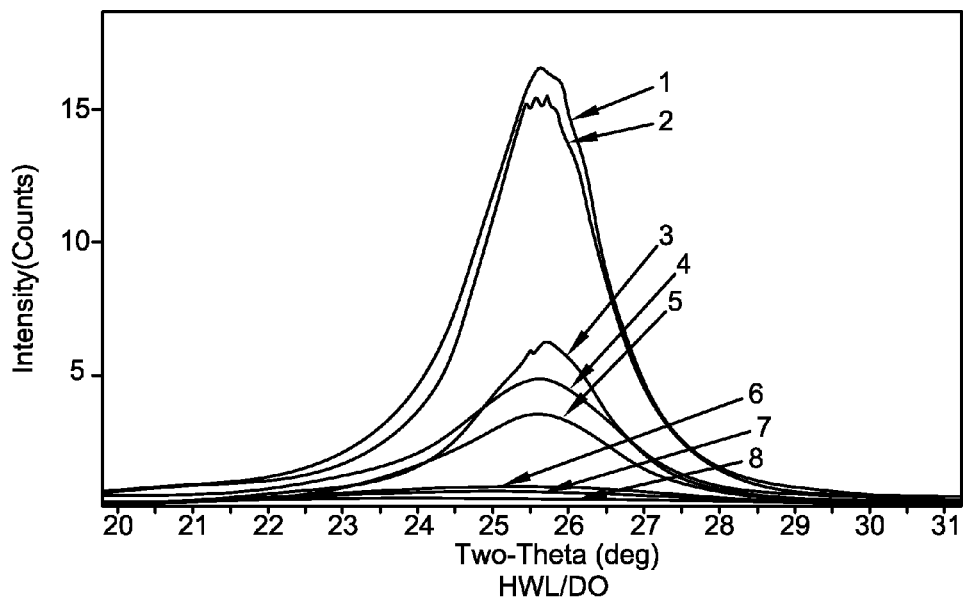
FIG. 7 is a XRD for calcined HWL/decant oil mixtures.

Table a for FIG. 7 Percentages by Weight

| (1) | 90% DO | 10% HWL |
|---|---|---|
| (2) | 95% DO | 5% HWL |
| (3) | 80% DO | 20% HWL |
| (4) | 67% DO | 33% HWL |
| (5) | 50% DO | 50% HWL |
| (6) | 25% DO | 75% HWL |
| (7) | 33% DO | 67% HWL |
| (8) | 0% DO | 100% HWL |

Figure 8:
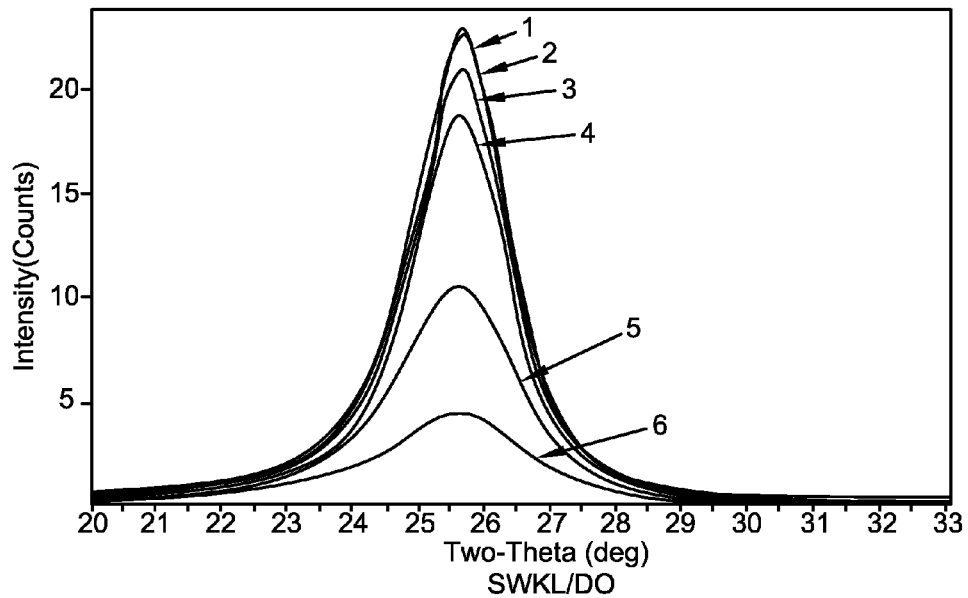
FIG. 8 is a XRD for calcined SWKL/decant oil mixtures.

Though not to be limited to any particular theory it is believed that the change in the properties of graphite artifacts with increasing lignin percentage is attributed to the formation of less ordered turbostratic carbon structures. An examination of the calcined and graphitized samples by XRD provided insight into this phenomenon. It was observed that increasing lignin percentage leads to a pronounced increase in the ($d_{002}$) diffraction peak in both the calcined and graphitized mixtures. XRD analysis of the calcined HWL and SWKL are shown in FIGS. 7 and 8 respectively. All percentages are by weight.

Table B for FIG. 8 Percentages by Weight

| (1) | 90% DO | 10% SWKL |
|---|---|---|
| (2) | 95% DO | 5% SWKL |
| (3) | 80% DO | 20% SWKL |
| (4) | 75% DO | 25% SWKL |
| (5) | 67% DO | 33% SWKL |
| (6) | 50% DO | 50% SWKL |

While two distinct peaks corresponding to graphitic and turbostratic carbons are not present, it is assumed the peaks shown are a product of the coalescence of the individual peaks. This results in a broadening of the peak with increased lignin percentage. The 2θ values of the mixtures approach the value of 26.54° reported for the ($d_{002}$) peak of graphite with an average $d_{002}$ of 3.46 Å. XRD analysis of calcined lignin cokes containing lignin percentages greater than 50% display peak heights of negligible value (FIG. 7). Interestingly the mixture containing 10% lignin displays a peak intensity greater than the 5% lignin mixture (FIG. 7). The same phenomenon is observed for the SWKL calcined mixtures as well (FIG. 8).

Figure 9:
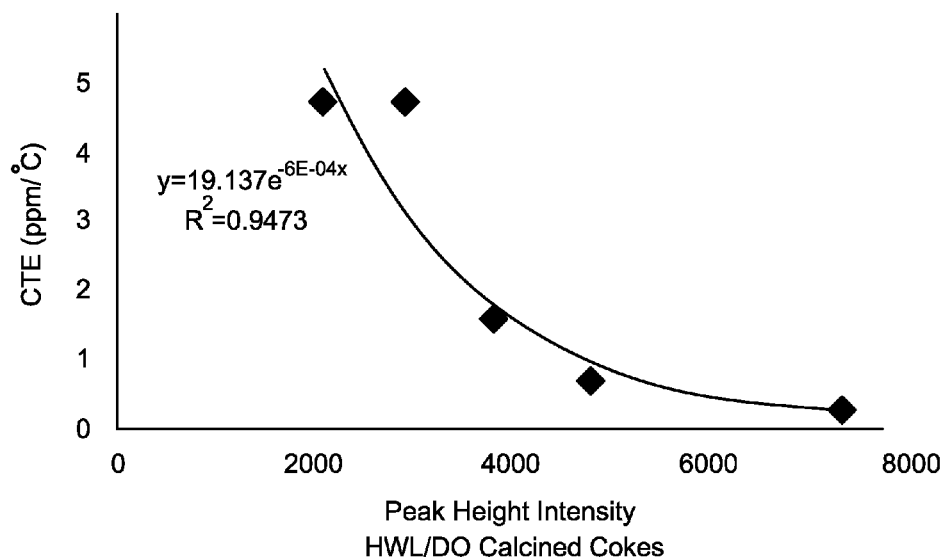
FIG. 9 is a plot of XRD peak intensity vs. CTE for HWL/decant oil mixtures of calcined cokes.

FIG. 9 shows a correlation between the ($d_{002}$) peak intensity and the corresponding CTE values. It is expected that at concentrations higher than 50% HWL CTE values will approach a threshold, whereby CTE no longer increases with increased lignin percentage.

Figure 10:
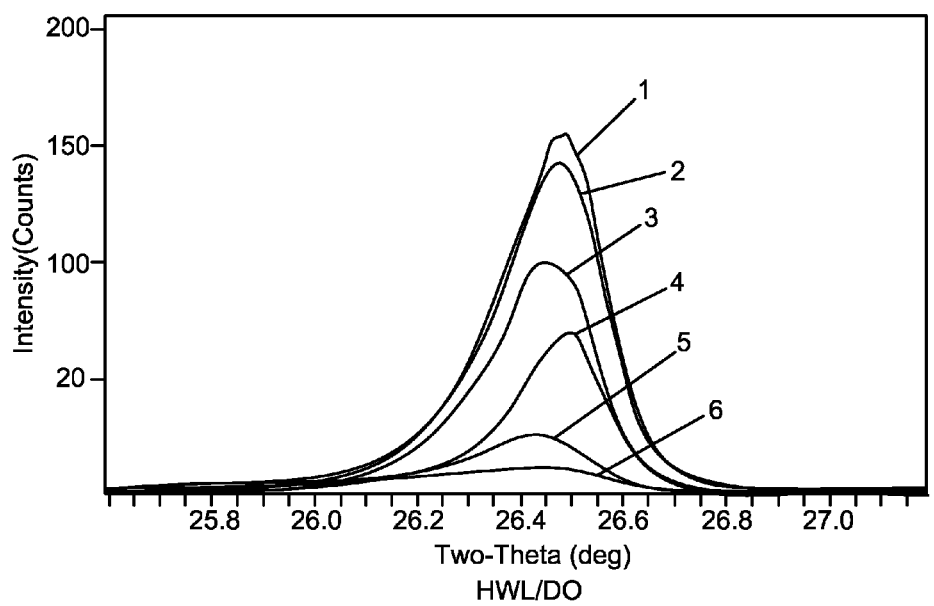
FIG. 10 is a XRD for HWL/decant oil graphitized rods.

XRD analysis of the graphitized rods is summarized in Table 8 and shown in FIG. 10 for the coke rods. The values obtained for 2θ and $d_{002}$ approach that of the theoretical values for graphite.

Table C for FIG. 10 Percentages by Weight

| (1) | 95% DO | 5% HWL/DO |
|---|---|---|
| (2) | 90% DO | 10% HWL/DO |
| (3) | 80% DO | 20% HWL/DO |
| (4) | 75% DO | 25% HWL/DO |
| (5) | 67% DO | 33% HWL/DO |
| (6) | 50% DO | 50% Lignin |

TABLE 8

XRD analysis of HWL/DO graphitized rods

| % Lignin | Peak Height Intensity | CTE (ppm/° C.) | 2Θ | $d_{002}(Å)$ |
|---|---|---|---|---|
| 50 | 7777 | 4.692 | 26.417 | 3.431 |
| 33 | 17581 | 4.668 | 26.368 | 3.373 |
| 25 | 51109 | 2.192 | 26.439 | 3.369 |
| 20 | 73372 | 1.596 | 26.403 | 3.373 |
| 10 | 103413 | 0.665 | 26.419 | 3.371 |
| 5 | 112669 | 0.238 | 26.422 | 3.371 |

Figure 11:
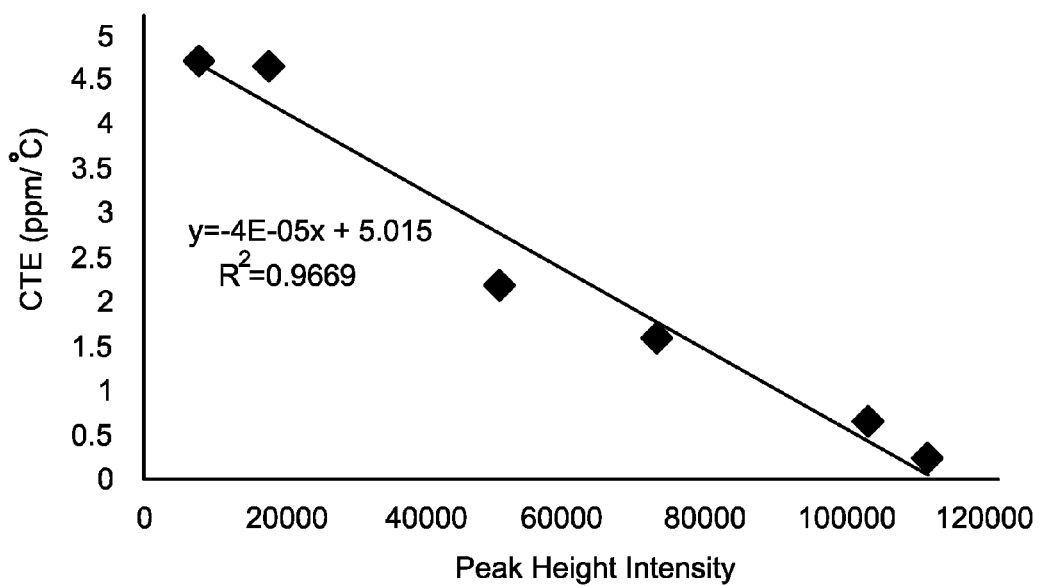
FIG. 11 is a plot of XRD peak intensity vs. CTE for HWL/decant oil mixtures of graphitized rods.

Similar to the calcined cokes there was an obvious correlation between peak height and CTE in the graphitized rods. (FIG. 11 and Table 8). Mixtures containing greater than 25% lignin display a negligible peak height intensity which is characteristic of an amorphous structural ordering and crystalinity of such cokes which exhibit extremely high electrical resistivity and CTE values.

It should be noted that the discrepancy in FIG. 7 whereby the mixture containing 10% lignin displayed a 2θ peak intensity greater than the mixture containing 5% lignin does not repeat in the XRD analysis of the graphitized rods (FIG. 10).

Mixtures containing various weight percentages of HWL, SWKL and decant oil were prepared and pyrolized under conditions designed for the preparation of high quality petroleum coke. The effects of lignin percentage on yield, CTE, specific resistivity, and density were examined. XRD analysis showed clear correlations between $d_{002}$ peak intensity and CTE in both calcined cokes as well as graphite rods. It was also shown that much lower CTE values are obtained from coke rods prepared from individually pyrolized mixtures of lignin and DO as compared to co-coked mixtures. It was found that up to about twenty (20%) weight percent SWKL may be incorporated into mixtures with DO while holding CTE values below 1.0 ppm/° C. employing co-coked and at least up to about twenty-five (25%) weight percent employing pre-pyrolized lignin/DO mixtures.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

Thus, although there have been described particular embodiments of the present invention of a new and useful method for making carbon fiber, it is not intended that such references be construed as limitations upon the scope of this invention except as set forth in the following claims.

What is claimed is:

1. method of making a graphite article with a desired set of properties, comprising:
   a. mixing a first amount of coke derived from a petroleum product with a second amount of coke derived from lignin, thereby forming a green mixture;
   b. forming the green mixture into a desired shape, thereby forming a green article; and
   c. carbonizing and graphitizing the green article,
   whereby the second amount of coke comprises a sufficient quantity to change at least a selected property of the graphite article to obtain the desired set of properties of the graphite article as compared to a second graphite article made from the coke derived from the petroleum product.

2. The method of claim 1 wherein the petroleum product comprises at least one of decant oil, decant oil based pitch, petroleum pitch and combinations thereof.

3. The method of claim 1 wherein the second amount comprises by weight at least 0.01 percent to less than 50 percent of a total amount of coke used to make the graphite article.

4. The method of claim 1 wherein the petroleum product comprises decant oil and the first amount of coke comprises needle coke.

5. The method of claim 1 wherein the selected property includes the coefficient of thermal expansion (CTE).

6. The method of claim 1 wherein the selected property includes the $d_{002}$ spacing between layered planes within the graphite article.

7. The method of claim 1 wherein the selected property includes the char weight of the graphite article.

8. The method of claim 1 wherein the selected property includes the modified Conradson carbon (MCC) of the graphite article.

9. The method of claim 1 wherein the selected property includes coke yield.

10. The method of claim 1 wherein the selected property includes at least one of bulk density of the graphite article, specific resistance of the graphite article and real density of the graphite article.

11. The method of claim 1 further comprising forming the second amount of coke by mixing solid lignin and decant oil.

12. The method of claim 11 wherein the forming further comprises:
   heating the decant oil; and
   mixing the heated decant oil with the solid lignin via mechanical stirring.

13. The method of claim 12 further comprising forming the second amount of coke by pyrolizing the lignin and the decant oil.

* * * * *